United States Patent [19]
Kadowaki

[11] Patent Number: 6,066,978
[45] Date of Patent: May 23, 2000

[54] PARTIAL PRODUCT GENERATING CIRCUIT

[75] Inventor: Yukio Kadowaki, Nara, Japan

[73] Assignee: Ricoh Company, Ltd., Tokyo, Japan

[21] Appl. No.: 09/186,581

[22] Filed: Nov. 5, 1998

[30]     Foreign Application Priority Data

Nov. 6, 1997  [JP]  Japan ................................. 9-304501

[51] Int. Cl.[7] .............................................. H03K 17/62
[52] U.S. Cl. ........................................ 327/407; 327/408
[58] Field of Search ................................. 327/403–405, 327/407–413

[56]             References Cited

U.S. PATENT DOCUMENTS

| 5,760,622 | 6/1998 | Ishigaki | 327/407 |
| 5,789,966 | 8/1998 | Bechade | 327/408 |

FOREIGN PATENT DOCUMENTS

| 619685 | 1/1994 | Japan . |
| 7160476 | 6/1995 | Japan . |

OTHER PUBLICATIONS

N. Ohkubo, et al., "A 4.4 ns CMOS 54 ×54–b Multiplier Using Pass–Transistor Multiplexer", IEEE Journal of Solid–State Circuits, vol. 30, No. 3, Mar. 1995, pp. 251–256.

C.R. Baugh, et al., "A Two's Complement Parallel Array Multiplication Algorithm", IEEE Transactions of Computers, vol. C–22, No. 12, Dec. 1973, pp. 1045–1047.

L.P. Rubinfield, "A Proof of the Modified Booth's Algorithm for Mulitiplication", IEEE Transactions of Computers, Oct. 1975, pp. 1014–1015.

Sholmo Waser, Monolithic Memories, Ince, "High–Speed Monolithic Mulitpliers for Real–Time Digital Signal Processing," Oct. 1978, pp. 19–29.

*Primary Examiner*—Toan Tran
*Attorney, Agent, or Firm*—Cooper & Dunham LLP

[57]             ABSTRACT

A group of pass transistors causes $x_i$, $x_i\_B$ to pass therethrough when 1X indicates affirmation but not pass therethrough when 1X indicates negation, and causes $x_{i-1}$, $x_{i-1}\_B$ to pass therethrough when 2X indicates affirmation but not pass therethrough when 2X indicates negation. In a switch-transistor arrangement portion, when each of 1X and 2X has a value indicating negation, a first electric potential appears at a first node, and a second electric potential appears at a second node. A positive-and-negative-responding pass-transistor group causes the value of the first node to pass therethrough when COMP has a value indicating negation, and causes the value of the second node to pass therethrough when COMP has a value indicating affirmation.

3 Claims, 2 Drawing Sheets

PARTIAL PRODUCT GENERATING CIRCUIT

BACKGROUND OF THE INVENTION

1. Field of the Invention

The present invention relates to a partial product generating circuit which receives signals from a secondary Booth's encoder, selects multiplicands and outputs a partial product.

2. Description of the Related Art

As a secondary Booth's encoder, there is a circuit disclosed in Japanese Laid-Open Patent Application No. 7-160476 as an example of the Prior Art. This circuit has three predetermined places of bits of a multiplier Y input thereto, and outputs a signal 1X which indicates that a multiplicand X is multiplied by 1, a signal 2X which indicates that the multiplicand X is multiplied by 2, and a signal COMP (NEG) which indicates whether the multiplicand X is multiplied by a positive value or a negative value. As a partial product generating circuit which outputs a partial product using the outputs of a Booth's encoder, there is a circuit disclosed in Japanese Laid-Open Patent Application No. 7-160476 as an example of the Prior Art. This circuit includes three NAND gates and an XOR gate. This circuit has the signals 1X, 2X and COMP (NEG) input thereto, also has an arbitrary bit $x_i$ and an adjacent bit $x_{i-1}$ less significant than the bit $x_i$ by one place of a multiplicand X input thereto, and outputs a partial product PP.

However, in the above-described partial product generating circuit, passing through three stages of gates, that is, the two stages of NAND gates and the one stage of an XOR gate, is required for generating a partial product for a multiplicand. Thereby, it is not possible to achieve high-speed partial product generation. Further, the power consumption is large.

In consideration of this point, Japanese Laid-Open Patent Application No. 7-160476 discloses partial product generating circuits using multiplexers. Specifically, an arrangement including three stages of multiplexers and arrangements each including two stages of multiplexers are disclosed.

However, in the arrangement including the three stages of multiplexers, passing through three stages of gates, that is, the three stages of multiplexers, is required for generating a partial product for a multiplicand. Thereby, it is not possible to achieve high-speed partial product generation. Further, in the arrangements each including the two stages of multiplexers, although it is possible to achieve high-speed partial product generation, because the number of pass transistors included in the multiplexers is large, the circuit scale is large.

Further, Japanese Laid-Open Patent Application No. 6-19685 also discloses a partial product generating circuit. The thus-disclosed partial product generating circuit is similar to the above-described arrangement including the NAND gates and the XOR gate. Therefore, it is not possible to achieve high-speed partial product generation, and, also, the power consumption is large.

SUMMARY OF THE INVENTION

The present invention is directed to eliminating the above-mentioned problems. An object of the present invention is to provide a partial product generating circuit, which has a small circuit scale, can operate at high speed, and consumes a small amount of power.

A partial product generating circuit, according to the present invention, having a signal 1X which indicates that a multiplicand X is multiplied by 1, an inverted signal 1X_B of the signal 1X, a signal 2X which indicates that the multiplicand X is multiplied by 2, an inverted signal 2X_B of the signal 2X, a signal COMP which indicates that the multiplicand X is multiplied by a negative value, and an inverted signal COMP_B of the signal COMP input thereto from a Booth's encoder, also, having an arbitrary bit $x_i$ of the multiplicand X, an inverted signal $x_i\_B$ of the bit $x_i$, an adjacent bit $x_{i-1}$ less significant than the bit $x_i$ by one place, and an inverted signal $x_{i-1}\_B$ of the bit $x_{i-1}$ input thereto, and outputting a partial product, comprises:

a group of pass transistors comprising a first pass transistor having $x_i$ input thereto, a second pass transistor having $x_{i-1}$ input thereto, a third pass transistor having $x_i\_B$ input thereto, and a fourth pass transistor having $x_{i-1}\_B$ input thereto, causing $x_i$, $x_i\_B$ to pass therethrough when 1X indicates affirmation but not pass therethrough when 1X indicates negation, and causing $x_{i-1}$, $x_{i-1}\_B$ to pass therethrough when 2X indicates affirmation but not pass therethrough when 2X indicates negation;

a switch-transistor arrangement portion in which the output terminal of the first pass transistor and the output terminal of the second pass transistor are connected with one another at a first node, first two switch transistors are connected in series between the first node and a first electric potential, 1X_B is input to the gate of one of the first two switch transistors, 2X_B is input to the other of the first two switch transistors, the output terminal of the third pass transistor and the output terminal of the fourth pass transistor are connected with one another at a second node, second two switch transistors are connected in series between the second node and a second electric potential, 1X is input to the gate of one of the second two switch transistors, and 2X is input to the other of the second two switch transistors, so that, when each of 1X and 2X has a value indicating negation, the first electric potential appears at the first node, and the second electric potential appears at the second node; and a positive-and-negative-responding pass-transistor group comprising a fifth pass transistor connected to the first node and a sixth pass transistor connected to the second node, having an outputting portion at which the output terminal of the fifth pass transistor and the output terminal of the sixth pass transistor are connected with one another, causing the value of the first node to pass therethrough when COMP has a value indicating negation, and causing the value of the second node to pass therethrough when COMP has a value indicating affirmation.

In this arrangement, the number of stages of gates required for generation of the partial product for the multiplicand is two, the stages being the group of pass transistors and the positive-and-negative-responding pass-transistor group. Further, each pass transistor operates at high speed. As a result, generation of the partial product can be performed at high speed. Further, through the switch-transistor arrangement portion, when each of 1X and 2X has a value indicating negation, the first electric potential (for example, the electric potential of the ground) appears at the first node, and the second electric potential (for example, the electric potential of a positive supply voltage) appears at the second node. Therefore, the outputs have no logical contradiction. Further, because this arrangement includes only the six pass
} transistors, it is possible to reduce the circuit scale in comparison to the arrangement disclosed in Japanese Laid-Open Patent Application No. 7-160476. Further, in comparison to the partial product generating circuit disclosed in Japanese Laid-Open Patent Application No. 6-19685 which includes the NAND circuits and XOR circuit, it is possible to reduce the power consumption.

The partial product generating circuit may further comprise an inverted-output positive-and-negative-responding pass-transistor group comprising a seventh pass transistor connected to said second node and an eighth pass transistor connected to said first node, having an outputting portion at which the output terminal of said seventh pass transistor and the output terminal of said eighth pass transistor are connected with one another, causing the value of said second node to pass therethrough when COMP has the value indicating negation, and causing the value of said first node to pass therethrough when COMP has the value indicating affirmation. When the inverted value of the partial product is obtained by using the output of the positive-and-negative-responding pass-transistor group, it is necessary to provide an extra gate, and, thereby, it is not possible to obtain the inverted value of the partial product at high speed. As a result of providing the inverted-output positive-and-negative-responding pass-transistor group, it is not necessary to provide the extra gate, and, thus, it is possible to obtain the inverted value of the partial product at high speed.

The partial product generating circuit may further comprise a first inverter connected to said output portion of said positive-and-negative-responding pass-transistor group, and a second inverter connected to said output portion of said inverted-output positive-and-negative-responding pass-transistor group. When a load of the partial product generating circuit is large, and the outputs of the fifth, sixth, seventh and eighth pass transistors are used as they are, the operation speed may extremely decrease. This problem of decrease in the operation speed is solved as a result of the first inverter and the second inverter being provided and buffering being performed in the partial product generating circuit. Further, the values obtained from the output portion of the positive-and-negative-responding pass-transistor group and the output portion of the inverted-output positive-and-negative-responding pass-transistor group are inverted by the first inverter and the second inverter, respectively. Therefore, when the partial product and the inverted value of the partial product are needed at the same time, these values are obtained from the first inverter and the second inverter. Thus, decrease in the operation speed is prevented, and, also, the partial product and the inverted value of the partial product are obtained at the same time.

Other objects and further features of the present invention will become more apparent from the following detailed description when read in conjunction with the accompanying drawings.

DETAILED DESCRIPTION OF THE PREFERRED EMBODIMENT

Figure 1:
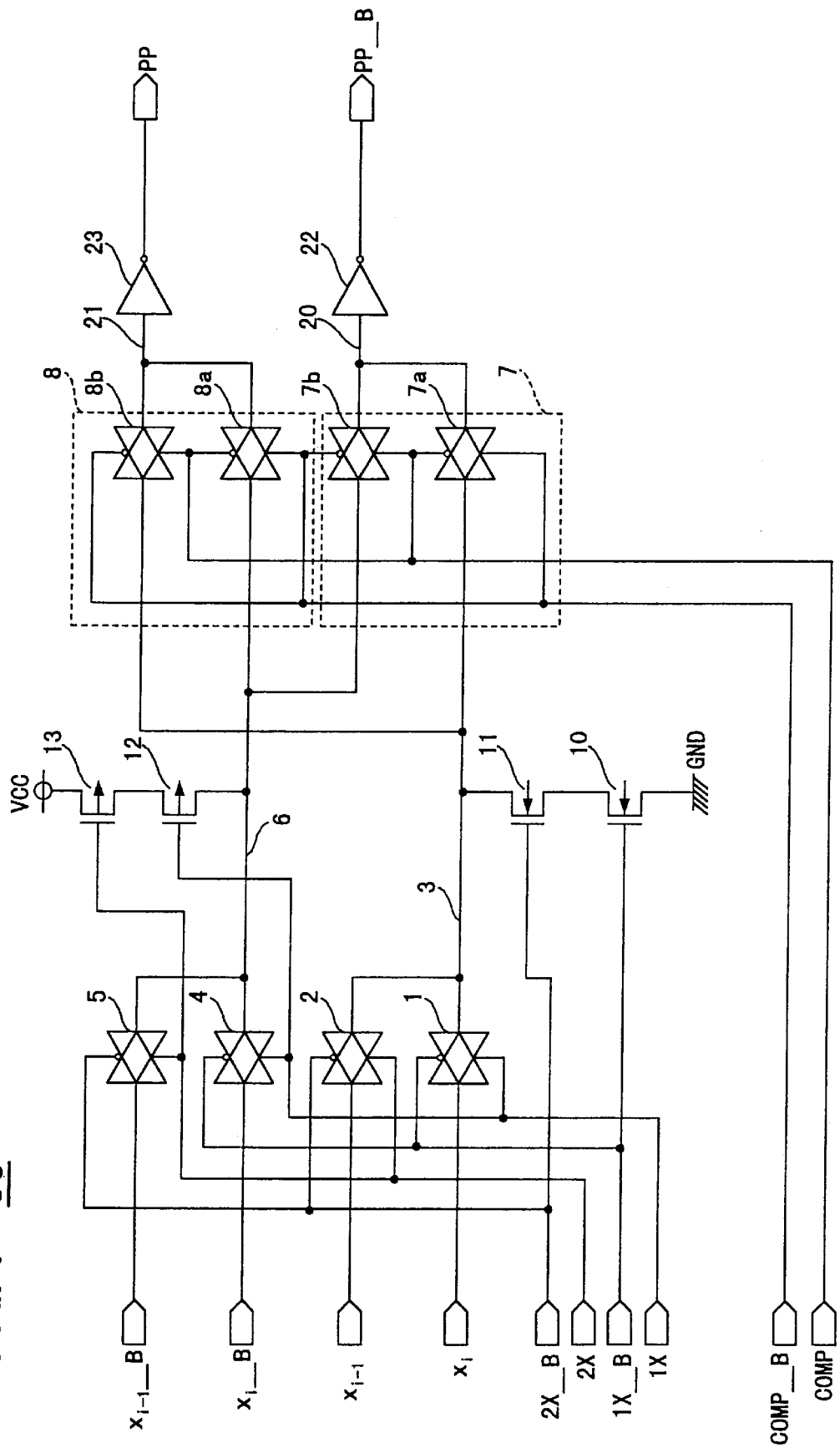
FIG. 1 shows a circuit diagram of a partial product generating circuit in one embodiment of the present invention.
Figure 2:
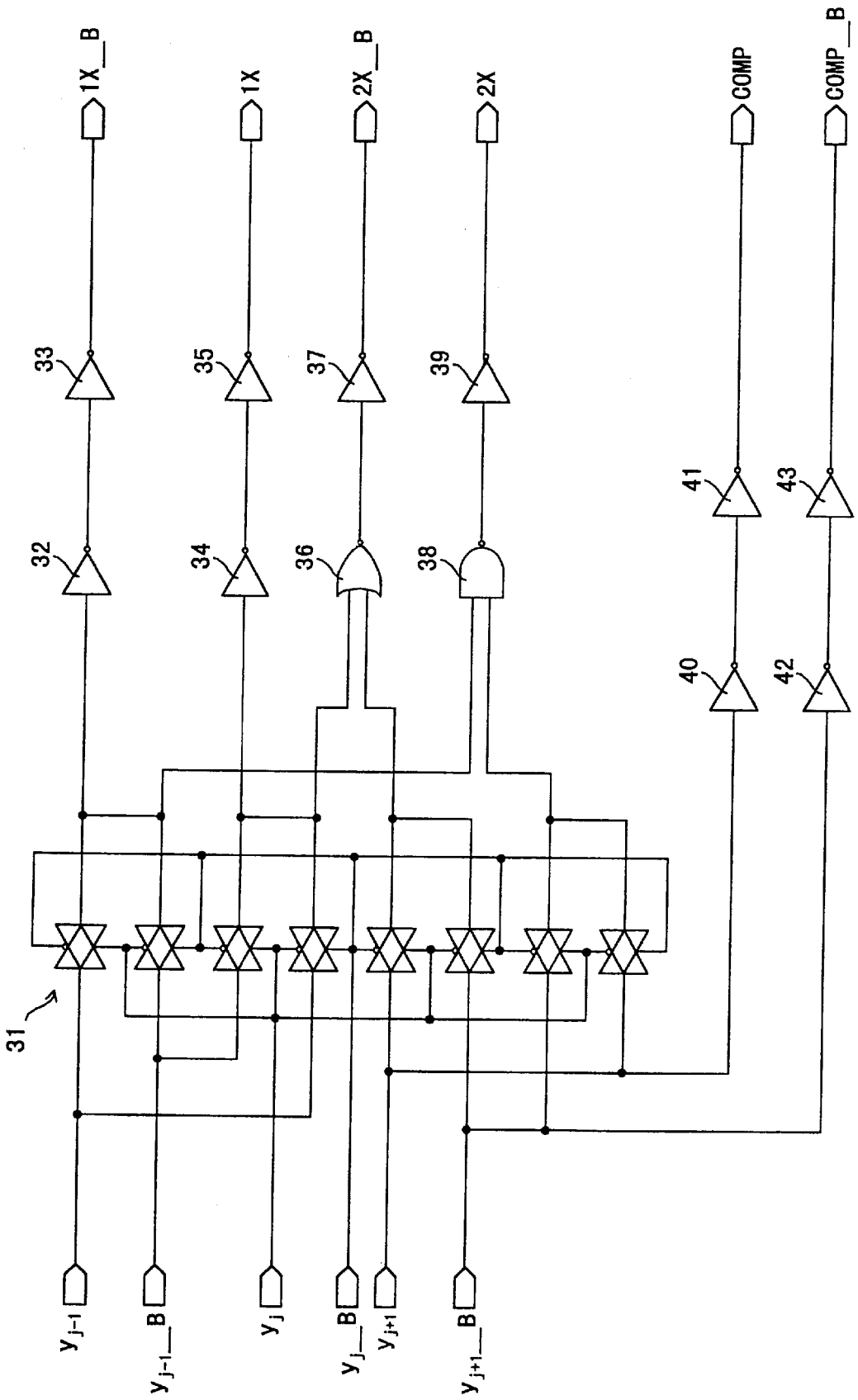
FIG. 2 shows a circuit diagram of a Booth's encoder used for the partial product generating circuit shown in FIG. 1.

FIG. 1 shows a circuit diagram of a partial product generating circuit 50 in one embodiment of the present invention, and FIG. 2 shows a circuit diagram of a Booth's encoder 60. The Booth's encoder used for the embodiment should be one which uses a secondary Booth's algorithm, outputs ordinary signals (1X, 2X, COMP, described later), and, also, outputs the inverted signals (1X_B, 2X_B, COMP_B) of the signals (1X, 2X, COMP). The Booth's encoder used for the embodiment is not limited to the Booth's encoder 60 shown in FIG. 2, and various arrangements can be used. The Booth's encoder used for the embodiment will now be simply described. The Booth's encoder uses three adjacent bits $y_{j-1}$, $y_j$, $y_{j+1}$ of a multiplier Y, and outputs the signal 1X indicating that a multiplicand X is multiplied by 1, the signal 2X indicating that the multiplicand X is multiplied by 2, and the signal COMP indicating that the multiplicand X is multiplied by a negative value. For example, when 1X has the value "0", 2X has the value "1" and COMP has the value "1", the signals {1X, 2X, COMP} indicate that the multiplicand X is multiplied by "−2". When the multiplier Y of the multiplication X·Y of the multiplicand X and the multiplier Y is transformed in accordance with the secondary Booth's algorithm, the following expression is obtained:

$$(y_{j-1}+y_j-2y_{j+1}) \cdot X \cdot 2^j.$$

The Booth's encoder embodies the term $(y_{j-1}+y_j-2y_{j+1})$ of the above expression so as to output the signals 1X, 2X and COMP which indicate the result of the calculation of the term $(y_{j-1}+y_j-2y_{j+1})$.

The circuit 60, shown in FIG. 2, has $y_{j-1}$, $y_j$, $y_{j+1}$ and the inverted values $y_{j-1}\_B$, $y_j\_B$, $y_{j+1}\_B$ of $y_{j-1}$, $y_j$, $y_{j+1}$ input thereto, generates 1X_B through a group of pass transistors 31 and inverters 32, 33, generates 1X through the group of pass transistors 31 and inverters 34, 35, generates 2X_B through the group of pass transistors 31, a NOR gate 36 and an inverter 37, generates 2X through the group of pass transistors 31, a NAND gate 38 and an inverter 39, generates COMP through inverters 40, 41 and generates COMP_B through inverters 42, 43.

The relationship between $y_{j-1}$, $y_j$, $y_{j+1}$ and 1X, 2X, COMP is indicated by the following truth table:

| $y_{j+1}$ | $y_j$ | $y_{j-1}$ | value | 1X | 2X | COMP |
|---|---|---|---|---|---|---|
| 0 | 0 | 0 | 0 | 0 | 0 | 0 |
| 0 | 0 | 1 | 1 | 1 | 0 | 0 |
| 0 | 1 | 0 | 1 | 1 | 0 | 0 |
| 0 | 1 | 1 | 2 | 0 | 1 | 0 |
| 1 | 0 | 0 | −2 | 0 | 1 | 1 |
| 1 | 0 | 1 | −1 | 1 | 0 | 1 |
| 1 | 1 | 0 | −1 | 1 | 0 | 1 |
| 1 | 1 | 1 | 0 | 0 | 0 | 1 |

Each value of the column labeled "value" of the above table is the value obtained from the calculation of the term $(y_{j-1}+y_j-2y_{j+1})$, by which the multiplicand X is multiplied.

The partial product generating circuit 50 shown in FIG. 1 will now be described. The partial product generating circuit 50 has the signals (1X, 2X, COMP, 1X_B, 2X_B, COMP_B) from the above-described Booth's encoder, and predetermined places $x_i$, $x_{i-1}$ of the multiplicand X and the inverted values $x_i\_B$, $x_{i-1}\_B$ of $x_i$, $x_{i-1}$ input thereto.

$x_i$ of the multiplicand X is input to the input terminal of a pass transistor 1. Signal lines are connected so that 1X is input to the affirmation-side control terminal of the pass transistor 1 and 1X_B is input to the negation-side control terminal of the pass transistor 1. Thereby, when 1X is "1" and 1X_B is "0", the pass transistor 1 causes $x_i$ of the multiplicand X to pass therethrough.

$x_{i-1}$ of the multiplicand X is input to the input terminal of a pass transistor 2. Signal lines are connected so that 2X is input to the affirmation-side control terminal of the pass transistor 2 and 2X_B is input to the negation-side control terminal of the pass transistor 2. Thereby, when 2X is "1" and 2X_B is "0", the pass transistor 2 causes $x_{i-1}$ of the multiplicand X to pass therethrough.

The inverted value $x_i$_B is input to the input terminal of a pass transistor 4. Signal lines are connected so that 1X is input to the affirmation-side control terminal of the pass transistor 4 and 1X_B is input to the negation-side control terminal of the pass transistor 4. When 1X is "1" and 1X_B is "0", the pass transistor 4 causes the inverted value $x_i$_B to pass therethrough.

The inverted value $x_{i-1}$_B is input to the input terminal of a pass transistor 5. Signal lines are connected so that 2X is input to the affirmation-side control terminal of the pass transistor 5 and 2X_B is input to the negation-side control terminal of the pass transistor 5. When 2X is "1" and 2X_B is "0", the pass transistor 5 causes the inverted value $x_{i-1}$_B to pass therethrough.

The output terminal of the pass transistor 1 and the output terminal of the pass transistor 2 are connected with one another. This connection point (referred to as a first node 3, hereinafter) is connected with one terminal of an N-channel MOS transistor 11, N-channel MOS transistors 11 and 10 being connected with one another in series. One terminal of the N-channel MOS transistor 10 is connected to GND (ground). 2X_B is input to the gate of the N-channel MOS transistor 11, and 1X_B is input to the gate of the N-channel MOS transistor 10.

The output terminal of the pass transistor 4 and the output terminal of the pass transistor 5 are connected with one another. This connection point (referred to as a second node 6, hereinafter) is connected with one terminal of an P-channel MOS transistor 12, P-channel MOS transistors 12 and 13 being connected with one another in series. One terminal of the P-channel MOS transistor 13 is connected to VCC (a positive-supply-voltage line). 2X is input to the gate of the P-channel MOS transistor 13, and 1X is input to the gate of the P-channel MOS transistor 12.

The first node 3 is connected to the input terminal of a first pass transistor 7a of a pair of pass transistors 7 and to the input terminal of a second pass transistor 8b of a pair of pass transistors 8. The second node 6 is connected to the input terminal of a second pass transistor 7b of the pair of pass transistors 7 and to the input terminal of a first pass transistor 8a of the pair of pass transistors 8.

Signal lines are connected so that COMP_B is input to the affirmation-side control terminal of the first pass transistor 7a of the pair of pass transistors 7, and COMP is input to the negation-side control terminal of the first pass transistor 7a of the pair of pass transistors 7. Thereby, when COMP_B is "1" and COMP is "0", the pass transistor 7a causes the value of the first node 3 to pass therethrough.

Signal lines are connected so that COMP is input to the affirmation-side control terminal of the second pass transistor 7b of the pair of pass transistors 7, and COMP_B is input to the negation-side control terminal of the second pass transistor 7b of the pair of pass transistors 7. Thereby, when COMP is "1" and COMP_B is "0", the pass transistor 7b causes the value of the second node 6 to pass therethrough.

Signal lines are connected so that COMP_B is input to the affirmation-side control terminal of the first pass transistor 8a of the pair of pass transistors 8, and COMP is input to the negation-side control terminal of the first pass transistor 8a of the pair of pass transistors 8. Thereby, when COMP_B is "1" and COMP is "0", the pass transistor 8a causes the value of the second node 6 to pass therethrough.

Signal lines are connected so that COMP is input to the affirmation-side control terminal of the second pass transistor 8b of the pair of pass transistors 8, and COMP_B is input to the negation-side control terminal of the second pass transistor 8b of the pair of pass transistors 8. When COMP is "1" and COMP_B is "0", the pass transistor 7b causes the value of the first node 3 to pass therethrough.

The output terminal of the first pass transistor 7a and the output terminal of the second pass transistor 7b are connected with one another. This connection point (referred to as a first basic outputting portion) 20 may be used as a portion for outputting a partial product (PP). However, in the circuit shown in FIG. 1, an inverter 22 is connected to the connection point 20, and the output terminal of the inverter 22 is used as a portion for outputting the inverted value (PP_B) of the partial product. Further, the output terminal of the first pass transistor 8a and the output terminal of the second pass transistor 8b are connected with one another. This connection point (referred to as a second basic outputting portion) 21 may be used as a portion for outputting the inverted value (PP_B) of the partial product. However, in the circuit shown in FIG. 1, an inverter 23 is connected to the connection point 21, and the output terminal of the inverter 23 is used as a portion for outputting the partial product (PP).

Operations of the above-described partial product generating circuit 50 will now be described.

When {1X, 2X, COMP}={0, 0, 0}, the respective signals input to the partial product generating circuit 50 are as follows: {1X, 1X_B}={0, 1}, {2X, 2X_B}={0, 1}, {COMP, COMP_B}={0, 1}.

Thereby, each of the pass transistors 1, 2, 4, 5 enters the non-passing state. Because each of the N-channel MOS transistors 10, 11 is in the ON state, the first node 3 is at the LOW level, and has the value "0". Further, because each of P-channel MOS transistors 12, 13 is in the ON state, the second node 6 is in the HIGH state, and has the value "1". Because the pass transistor 8a is in the passing state and the pass transistor 8b is in the non-passing state, the value "1" of the second node 6 is input to the inverter 23. Accordingly, the resulting partial product PP is "0". Further, because the pass transistor 7a is in the passing state and the pass transistor 7b is in the non-passing state, the value "0" of the first node 3 is input to the inverter 22. Accordingly, the inverted value PP_B of the resulting partial product is "1".

When {1X, 2X, COMP}={1, 0, 0}, the respective signals input to the partial product generating circuit 50 are as follows: {1X, 1X_B}={1, 0}, {2X, 2X_B}={0, 1}, {COMP, COMP_B}={0, 1}.

Thereby, each of the pass transistors 1, 4 enters the passing state, and each of the pass transistors 2, 5 enters the non-passing state. Because the N-channel MOS transistor 10 enters the OFF state, $x_i$ of the multiplicand X appears at the first node 3. Further, because the P-channel MOS transistor 12 enters the OFF state, the inverted value $x_i$_B of $x_i$ of the multiplicand X appears at the second node 6. Because the pass transistor 8a is in the passing state and the pass transistor 8b is in the non-passing state, $x_i$_B of the second node 6 is input to the inverter 23. Accordingly, the resulting partial product PP is $x_i$. Further, because the pass transistor 7a is in the passing state and the pass transistor 7b is in the non-passing state, $x_i$ of the first node 3 is input to the inverter 22. Accordingly, the inverted value PP_B of the resulting partial product is $x_i$_B.

When {1X, 2X, COMP}={0, 1, 0}, the respective signals input to the partial product generating circuit 50 are as follows: {1X, 1X_B}={0, 1}, {2X, 2X_B}={1, 0}, {COMP, COMP_B}={0, 1}.

Thereby, each of the pass transistors 1, 4 enters the non-passing state, and each of the pass transistors 2, 5 enters the passing state. Because the N-channel MOS transistor 11 enters the OFF state, $x_{i-1}$ of the multiplicand X appears at the first node 3. Further, because the P-channel MOS transistor 13 enters the OFF state, the inverted value $x_{i-1}\_B$ of $x_{i-1}$ of the multiplicand X appears at the second node 6. Because the pass transistor 8a is in the passing state and the pass transistor 8b is in the non-passing state, $x_{i-1}\_B$ of the second node 6 is input to the inverter 23. Accordingly, the resulting partial product PP is $x_{i-1}$. Further, because the pass transistor 7a is in the passing state and the pass transistor 7b is in the non-passing state, $x_{i-1}$ of the first node 3 is input to the inverter 22. Accordingly, the inverted value PP_B of the resulting partial product is $x_{i-1}\_B$.

When {1X, 2X, COMP}={0, 1, 1}, the respective signals input to the partial product generating circuit 50 are as follows: {1X, 1X_B}={0, 1}, {2X, 2X_B}={1, 0}, {COMP, COMP_B}={1, 0}.

Thereby, each of the pass transistors 1, 4 enters the non-passing state, and each of the pass transistors 2, 5 enters the passing state. Because the N-channel MOS transistor 11 enters the OFF state, $x_{i-1}$ of the multiplicand X appears at the first node 3. Further, because the P-channel MOS transistor 13 enters the OFF state, the inverted value $x_{i-1}\_B$ of $x_{i-1}$ of the multiplicand X appears at the second node 6. Because the pass transistor 8a is in the non-passing state and the pass transistor 8b is in the passing state, $x_{i-1}$ of the first node 3 is input to the inverter 23. Accordingly, the resulting partial product PP is $x_{i-1}\_B$. Further, because the pass transistor 7a is in the non-passing state and the pass transistor 7b is in the passing state, $x_{i-1}\_B$ of the second node 6 is input to the inverter 22. Accordingly, the inverted value PP_B of the resulting partial product is $x_{i-1}$.

When {1X, 2X, COMP}={1, 0, 1}, the respective signals input to the partial product generating circuit 50 are as follows: {1X, 1X_B}={1, 0}, {2X, 2X_B}={0, 1}, {COMP, COMP_B}={1, 0}.

Thereby, each of the pass transistors 1, 4 enters the passing state, and each of the pass transistors 2, 5 enters the non-passing state. Because the N-channel MOS transistor 10 enters the OFF state, $x_i$ of the multiplicand X appears at the first node 3. Further, because the P-channel MOS transistor 12 enters the OFF state, the inverted value $x_i\_B$ of $x_i$ of the multiplicand X appears at the second node 6. Because the pass transistor 8a is in the non-passing state and the pass transistor 8b is in the passing state, $x_i$ of the first node 3 is input to the inverter 23. Accordingly, the resulting partial product PP is $x_i\_B$. Further, because the pass transistor 7a is in the non-passing state and the pass transistor 7b is in the passing state, $x_i\_B$ of the second node 6 is input to the inverter 22. Accordingly, the inverted value PP_B of the resulting partial product is $x_i$.

When {1X, 2X, COMP}={0, 0, 1}, the respective signals input to the partial product generating circuit 50 are as follows: {1X, 1X_B}={0, 1}, {2X, 2X_B}={0, 1}, {COMP, COMP_B}={1, 0}.

Thereby, each of the pass transistors 1, 2, 4, 5 enters the non-passing state. Because each of the N-channel MOS transistors 10, 11 is in the ON state, the first node 3 is at the LOW level, and has the value "0". Further, because each of the P-channel MOS transistors 12, 13 is in the ON state, the second node 6 is in the HIGH state, and has the value "1". Because the pass transistor 8a is in the non-passing state and the pass transistor 8b is in the passing state, the value "0" of the first node 3 is input to the inverter 23. Accordingly, the resulting partial product PP is "1". Further, because the pass transistor 7a is in the non-passing state and the pass transistor 7b is in the passing state, the value "1" of the second node 6 is input to the inverter 22. Accordingly, the inverted value PP_B of the resulting partial product is "0".

In the above-described arrangement, as described above, when {1X, 2X, COMP}={0, 0, 0}, that is, when "0" should be output as the partial product PP, that is, when the multiplicand should neither be multiplied by ±1 nor be multiplied by ±2, each of the pass transistors 1, 2, 4, 5 enters the non-passing state, each of the N-channel MOS transistors 10, 11 enters the ON state, and, also, each of the P-channel MOS transistors 12, 13 enters the ON state. Thereby, the first node 3 is forcibly caused to have the LOW level ("0"), and the second node 6 is forcibly caused to have the HIGH level ("1"). Thereby, the outputs PP and PP_B have no logical contradiction.

Further, the number of stages of gates to be passed through for obtaining the output of the partial product for the multiplicand is two. That is, the circuit shown in FIG. 1 includes the first stage of gates, that is, the pass transistors 1, 2, 4, 5, and the second stage of gates, that is, the pass transistors 7a, 7b, 8a, 8b. Thus, the number of stages of gates is small, and, also, each pass transistor operates at high speed. Thereby, it is possible to perform partial product generation at high speed. Further, in comparison to the partial product generating circuit disclosed in Japanese Laid-Open Patent Application No. 6-19685 which includes the NAND gates and the XOR gate, it is possible to reduce the power consumption.

It is possible that the output of the partial product is obtained from the first basic outputting portion 20. In this case, the pair of pass transistors 7, which acts as a positive-and-negative-responding pass-transistor group, is necessary, but the pair of pass-transistors 8, which acts as a positive-and-negative-responding pass-transistor group for outputting the inverted value, and the inverters 22, 23 are not necessary. In this case in which the pair of pass transistors 8 is not provided, only the six pass transistors (1, 2, 4, 5, 7a, 7b) are used. As a result, it is possible to reduce the circuit scale in comparison to the arrangement disclosed in Japanese Laid-Open Patent Application No. 7-160476.

An advantage obtained when the pair of pass transistors 8, which act as the positive-and-negative-responding pass-transistor group, are provided will now be described. The inverted value of the partial product can be obtained from the second basic outputting portion 21 instead of using the output of the first basic outputting portion 20. When the inverted value of the partial product is obtained by using the output of the first basic outputting portion 20, it is necessary to provide an extra gate, and, thereby, it is not possible to obtain the inverted value of the partial product at high speed. However, when the pair of pass transistors 8 are provided in addition to the pair of pass transistors 7, and either of the signals of the first and second nodes 3, 6 is output selectively based on COMP, COMP_B from each of the pairs of pass transistors 7, 8, as shown in FIG. 1, it is not necessary to provide the extra gate.

A reason why the inverters 22, 23 are provided will now be described. Because a half adder and/or a full adder are connected to the output side of the partial product generating circuit 50, the partial product generating circuit 50 should have some driving capability. The inverters 22, 23 are used as buffers (inverting buffers). In detail, when a load of the partial product generating circuit is large, and the outputs of the pass transistors 7a, 7b, 8a, 8b are used as they are, the operation speed may extremely decrease. Such a problem is solved as a result of buffering being performed in the partial product generating circuit 50 by the inverters 22, 23. Further, the partial product is generated on the side of the pair of pass transistors 7 and the inverted value of the partial product is generated on the side of the pair of pass transistors 8. Then, the thus-obtained values are inverted by the inverters 22, 23, respectively. Therefore, when the partial product and the inverted value of the partial product are needed at the same time, these values are obtained from the inverters 22 and 23. Thus, a decrease in the operation speed is prevented, and, also, the partial product and the inverted value of the partial product are obtained at the same time.

Further, the present invention is not limited to the above-described embodiment, and variations and modifications may be made without departing from the scope of the present invention.

The contents of the basic Japanese Patent Application No. 9-304501, filed on Nov. 6, 1997, are hereby incorporated by reference.

What is claimed is:

1. A partial product generating circuit having a signal 1X which indicates that a multiplicand X is multiplied by 1, an inverted signal 1X_B of the signal 1X, a signal 2X which indicates that the multiplicand X is multiplied by 2, an inverted signal 2X_B of the signal 2X, a signal COMP which indicates that the multiplicand X is multiplied by a negative value, and an inverted signal COMP_B of the signal COMP input thereto from a Booth's encoder, also, having an arbitrary bit $x_i$ of the multiplicand X, an inverted signal $x_i$_B of the bit $x_i$, an adjacent bit $x_{i-1}$ less significant than the bit $x_i$ by one place, and an inverted signal $x_{i-1}$_B of the bit $x_{i-1}$ input thereto, and outputting a partial product, said circuit comprising:

a group of pass transistors comprising a first pass transistor having $x_i$ input thereto, a second pass transistor having $x_{i-1}$ input thereto, a third pass transistor having $x_i$_B input thereto, and a fourth pass transistor having $x_{i-1}$_B input thereto, causing $x_i$, $x_i$_B to pass therethrough when 1X indicates affirmation but not pass therethrough when 1X indicates negation, and causing $x_{i-1}$, $x_{i-1}$_B to pass therethrough when 2X indicates affirmation but not pass therethrough when 2X indicates negation;

a switch-transistor arrangement portion in which the output terminal of said first pass transistor and the output terminal of said second pass transistor are connected with one another at a first node, first two switch transistors are connected in series between said first node and a first electric potential, 1X_B is input to the gate of one of said first two switch transistors, 2X_B is input to the other of said first two switch transistors, the output terminal of said third pass transistor and the output terminal of said fourth pass transistor are connected with one another at a second node, second two switch transistors are connected in series between said second node and a second electric potential, 1X is input to the gate of one of said second two switch transistors, and 2X is input to the other of said second two switch transistors, so that, when each of 1X and 2X has a value indicating negation, said first electric potential appears at said first node, and said second electric potential appears at said second node; and a positive-and-negative-responding pass-transistor group comprising a fifth pass transistor connected to said first node and a sixth pass transistor connected to said second node, having an outputting portion at which the output terminal of said fifth pass transistor and the output terminal of said sixth pass transistor are connected with one another, causing the value of said first node to pass therethrough when COMP has a value indicating negation, and causing the value of said second node to pass therethrough when COMP has a value indicating affirmation.

2. The partial product generating circuit as claimed in claim 1, further comprising an inverted-output positive-and-negative-responding pass-transistor group comprising a seventh pass transistor connected to said second node and an eighth pass transistor connected to said first node, having an outputting portion at which the output terminal of said seventh pass transistor and the output terminal of said eighth pass transistor are connected with one another, causing the value of said second node to pass therethrough when COMP has the value indicating negation, and causing the value of said first node to pass therethrough when COMP has the value indicating affirmation.

3. The partial product generating circuit as claimed in claim 2, further comprising:

a first inverter connected to said output portion of said positive-and-negative-responding pass-transistor group; and a second inverter connected to said output portion of said inverted-output positive-and-negative-responding pass-transistor group.

* * * * *